Aug. 18, 1970  J. FUHRMANN  3,525,099
HAND GUIDED WALK-BEHIND SELF-PROPELLED MATERIAL CONVEYING CART
Filed July 24, 1969  3 Sheets-Sheet 1
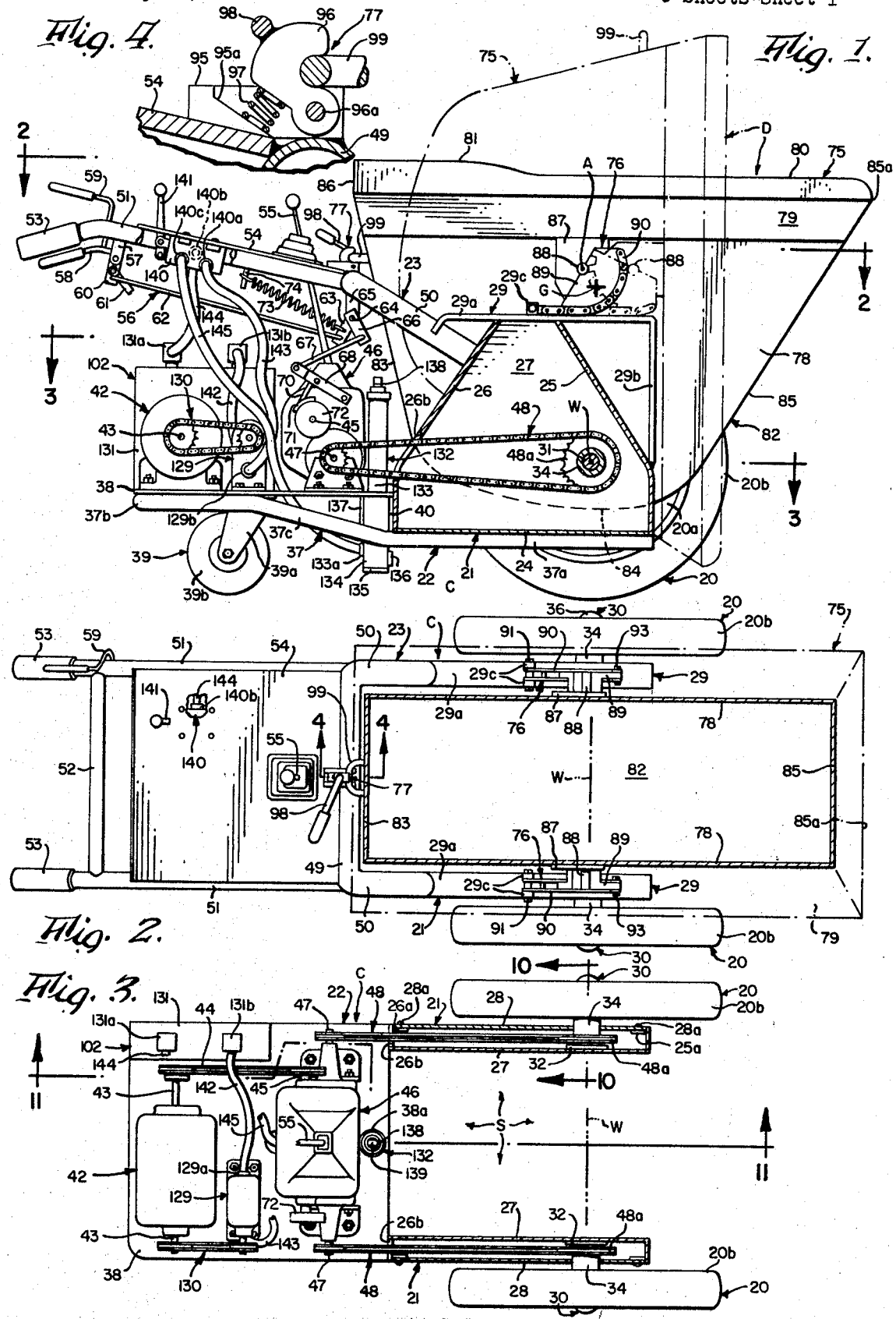

Aug. 18, 1970 J. FUHRMANN 3,525,099
HAND GUIDED WALK-BEHIND SELF-PROPELLED MATERIAL CONVEYING CART
Filed July 24, 1969 3 Sheets-Sheet 2

INVENTOR.
John Fuhrmann
BY
Sommer & Weber
ATTORNEYS

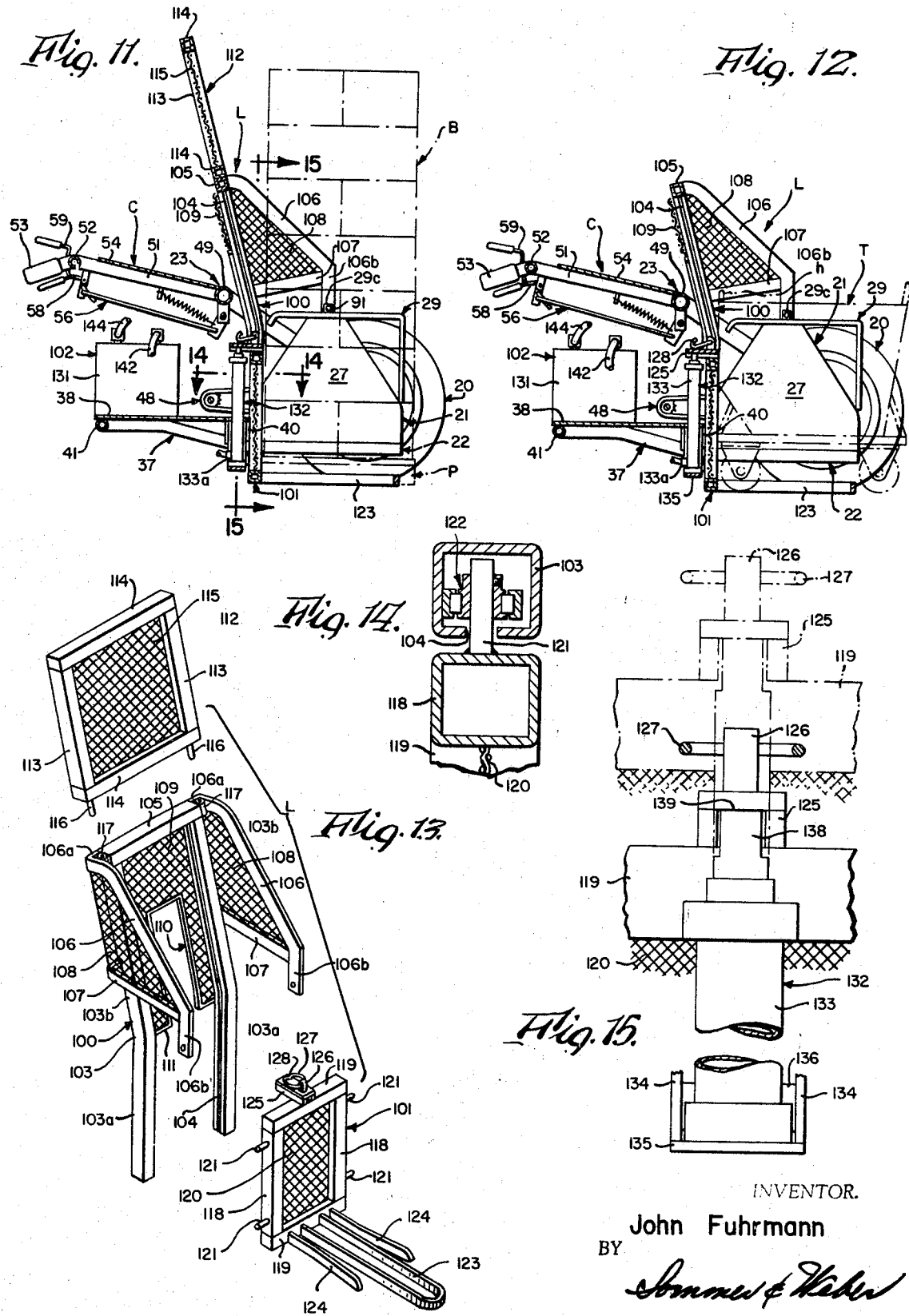

3,525,099
HAND GUIDED WALK-BEHIND SELF-PROPELLED
MATERIAL CONVEYING CART
John Fuhrmann, late of 1095 Center Road, West Seneca,
N.Y. 14224; John Fuhrmann, executor of said John
Fuhrmann, deceased
Continuation-in-part of application Ser. No. 621,977,
Mar. 9, 1967. This application July 24, 1969, Ser. No.
844,565
Int. Cl. B62b 3/06, 3/08
U.S. Cl. 298—2                                      24 Claims

ABSTRACT OF THE DISCLOSURE

A hand guider, walk-behind, self-propelled material conveying cart may be used either as a dump truck or as a lift truck and includes a pair of ground engaging side wheels journalled on a pair of interior side frames connected by upper and lower rear side frames and defining a large open space open at the top, front and bottom for receiving either a dump mechanism or a lift mechanism. The lower rear frame includes a platform supported by a rear swivel wheel and in turn supporting a drive engine, transmission and sprocket-chain drives for propelling the side wheels, and a hydraulic system including a reservoir, a pump driven by the driven engine and driving an upright motor having a piston for raising and lowering the lift mechanism. The upper rear frame includes a manually releasable keeper engageable with a latch on the rear of the dump bucket, and steering handles extending rearwardly beyond the lower rear frame and supporting manually operable throttle, brake and gear shift control mechanisms for controlling the starting, stopping, rate and direction of cart propulsion. As a dump truck, a dump bucket is arranged in the aforesaid space with its bottom below the side wheel axis to provide a low center of gravity and is mounted on the upper ends of the side frames to rotate about and reciprocate with its transverse swing axis reciprocable fore and aft between a rear horizontal loading position and a forward vertical unloading position. The bucket mounting mechanisms include gear segment pinions fixed on the bucket sides and rollable fore and aft along chain racks attached thereto and to the upper ends of the side frames, such segments locating the center of gravity of the bucket forwardly of its swing axis in the loading position and rearwardly thereof in the unloading position for automatic movement between such positions, upon release of the keeper. As a lift truck, a lift mechanism including a front load supporting frame and a rear guide frame is arranged in such space with the load supporting frame being raised and lowered by the piston.

CROSS REFERENCE TO RELATED APPLICATION

This application is a continuation-in-part of my copending application Ser. No. 621,977, filed Mar. 9, 1967, now abandoned and entitled Hand Guided Walk-Behind Dump Cart.

BACKGROUND OF THE INVENTION

Field of the invention

This invention relates to material conveying carts, and more particularly to a new and improved hand guided, walk-behind, self-propelled cart for conveying material either as a dump truck or as a lift truck.

Description of the prior art

A number of dump trucks of the hand guided, walk-behind, self-propelled type exist, but they are not designed to be converted to use as lift trucks. Furthermore, the buckets of such prior art dump trucks normally are mounted on a chassis or framework with the bottom of the bucket located above the side wheel axis and propelling mechanism to provide a relatively high center of gravity contributing to instability, whether the bucket be tiltable or not. Also, the tilting buckets usually are rotatable about a fixed swing axis, the location of which together with the design of the chassis often restrict the extent to which the bucket can be tilted forwardly, thereby interfering with the desired automatic unloading of the bucket. Moreover, the center of gravity of the bucket, whether in the loading or unloading position, ordinarily is located either to the rear of the swing axis, which requires either manual or mechanical assistance in tilting the bucket forwardly, or to the front of such swing axis, which requires such assistance in righting the bucket.

As for the prior art lift trucks, the self-propelled variety are of relatively complex construction, and the operator normally does not walk behind the truck but is seated thereon, and those that he does walk behind ordinarily are not self-propelled. In neither case are such lift trucks designed for conversion to use as a dump truck.

SUMMARY OF THE INVENTION

Accordingly, it is a primary object of the present invention to overcome the aforesaid and other limitations of the prior art by providing a new and improved, hand guided, walk-behind, self-propelled cart which is so constructed and designed as to convey material either as a dump truck or as a lift truck and to be convertible readily from one type to the other. To this end, the inventive cart includes a pair of spaced, parallel ground engaging wheels between which are severally journalled a pair of spaced, parallel and generally vertically extending side frames, the upper and lower portions of which are connected respectively by upper and lower superposed rear frames to define therewith a large space open at the top, front and bottom for selectively receiving either a dump mechanism or a lift mechanism, at least one of the side frames and rear frames including means for selectively attaching the dump mechanism or the lift mechanism, with the lower rear frame including a generally horizontal platform supported by a smaller rear ground-engaging swivel wheel, a drive engine mounted on the platform and drive means operatively connecting the drive engine with at least one of the aforesaid wheels, and with the upper rear frame including handle means arranged above and extending rearwardly beyond the lower rear frame for manually steering the cart and including means operatively associated with the drive engine and drive means for controlling the starting, stopping, rate and direction of propulsion of the cart.

Another object is to provide such inventive cart as a dump truck, wherein the dump mechanism includes a dump bucket arranged in such large space, means engaged by such attaching means and mounting the dump bucket on the upper ends of the side frames to rotate about and reciprocate with a generally horizontal, transverse swing axis reciprocable fore and aft above the side wheel axis between a rear and generally horizontal, loading position and a forward and generally vertical, unloading position, and latching means releasably holding the bucket in the loading position wherein the central part of the bottom of the bucket is below the side wheel axis to provide the bucket with a low center of gravity, such mounting means locating the center of gravity of the bucket forwardly of its swing axis when the bucket is in such loading position, whether filled or empty, but rearwardly of its swing axis when the bucket is in such unloading position and empty, whereby the bucket moves automatically not only forwardly from such loading position to such unloading position upon release of the latching means to dump its load, but also rearwardly from such unloading position to such loading position upon dumping its load.

Another object is to provide such inventive cart as a lift truck, wherein the lift mechanism includes an elongated and generally upright, guide frame arranged in the rear of said large space, engaged by such attaching means and mounted on the side frames, a load supporting frame arranged in such large space and reciprocable up and down along the guide frame, and fluid-operated means mounted on the platform and operatively connected to the load supporting frame for reciprocating the same.

These and additional objects and advantages of the invention will become apparent upon consideration of the following detailed description and accompanying drawings, wherein:

BRIEF DESCRIPTION OF THE DRAWINGS

FIG. 1 is a right side elevational view of the inventive material conveying cart as a dump truck, with the right hand side frame being broken away in section to show the sprocket-chain drive to the right side wheel, and with the dump bucket and its right mounting gear segment pinion and chain rack mechanism shown in solid lines in the rear upright loading position and in broken lines in the forward, generally vertical unloading position;

FIG. 2 is a top plan and sectional view taken along line 2—2 of FIG. 1 to better illustrate the handles and associated controls, as well as the bucket shape, with the enlarged portion of the bucket above the section being shown in phantom;

FIG. 3 is a sectional view taken along line 3—3 of FIG. 1 below the handles and with the bucket removed to better illustrate the relationships between the drive engine, transmission and both side wheel sprocket-chain components, together with the hydraulic lift system components;

FIG. 4 is an enlarged fragmentary section taken on line 4—4 of FIG. 2 illustrate details of the bucket latching mechanism;

FIG. 11 is a vertical section taken on line 11—11 of FIG. 10 and illustrating the inventive cart as a lift truck with the load supporting frame of the lift mechanism in its lower ground-engaging position beneath a load shown in broken lines in the form of a pallet supporting a stack of concrete blocks;

FIG. 12 is a view similar to FIG. 11, but with the load shown in broken lines being in the form of a mobile mortar tub;

FIG. 13 is an enlarged exploded perspective view of the guide frame and load supporting frame components of the lift mechanism;

FIG. 14 is an enlarged fragmentary section taken on line 14—14 of FIG. 11 to illustrate structural details of the relationship between a wheel on the reciprocal load supporting frame and a guide track channel of the guide frame, and FIG. 15 is an enlarged fragmentary section taken on line 15—15 of FIG. 11 to illustrate in detail the removable interengagement between the piston rod of the hydraulic motor and the load supporting frame reciprocated thereby between the lower ground-engaging position shown in solid lines and the elevated position shown in broken lines.

DESCRIPTION OF THE PREFERRED EMBODIMENTS

Cart

Figure 5:
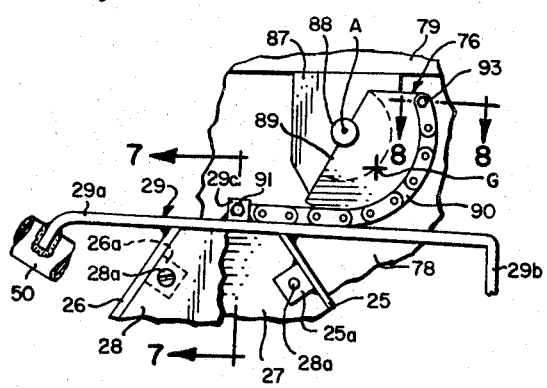
FIG. 5 is an enlarged fragmentary side elevation of the right hand chain rack and gear segment pinion bucket mounting mechanism of FIG. 1 in the rear loading position.

Referring to the drawings, and particularly FIGS. 1–3, a hand guided, walk-behind, self-propelled, material conveying cart constituting a preferred embodiment of the invention is generaly indicated at C. This cart, which may be used either as a dump truck or as a lift truck, includes a pair of spaced, parallel side wheels 20 having hubs 20a and ground-engaging rubber tires 20b and severally journalled on a pair of spaced, parallel side frames 21 disposed inwardly of and close to each respective side wheel. These side frames 21 in turn are connected by a lower rear frame 22 and an upper rear frame 23 defining therewith a large space S open at the top, front and bottom for receiving either a dump mechanism D (FIG. 1) or a lift mechanism L (FIG. 11).

Continuing with FIGS. 1–3, each side frame 21 is in the form of a hollow sheet metal housing of generally A-frame shape in longitudinal section, and including a substantially horizontal, elongated bottom wall 24 from each end of which rise the lower vertical portions of front and rear walls 25, 26 the upper ends of which converge toward each other, and inner and outer side walls 27, 28. The latter are removably attached as by machine screws 28a threaded through inturned lugs 25a, 26a (FIGS. 5 and 6) provided on the front and rear end walls respectively, while the remaining walls are suitably permanently secured together, such as by welding. Each side frame housing is completed by an upper end wall 29 which includes an elongated and generally horizontal longitudinal leg 29a closing the top of each housing 21 and projecting both forwardly and rearwardly beyond the upper edges of the front and rear end walls 25, 26, as well as a generally vertical front leg 29b which is suitably welded to front wall 25 at the juncture of its upper and lower portions. Leg 29a also is provided with a pair of laterally spaced and upwardly projecting lugs 29c (FIG. 7) for removably securing components of the dump mechanism D (FIG. 1) on the lift mechanism L (FIG. 11) to be described below.

Figure 10:
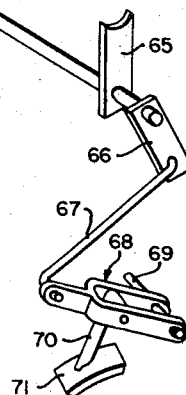
FIG. 10 is an enlarged fragmentary section taken on line 10—10 of FIG. 3 to illustrate structural details of the left side frame and device journalling the left side wheel thereon.

As also seen in FIG. 10, each side wheel 20 is journalled on the corresponding side frame 21 for rotation about a common generally horizontal transverse axis W by journalling means 30 extending transversely through an opening 28b provided in the outer side wall 28 and including a stub axle 31 provided at its inner end with a plate 32 suitably welded to the inside of inner side wall 27 and at its outer end with a reduced threaded shaft 33. Rotatably mounted over stub axle 31 and shaft 33 is a collar or journal 34, the inner end of which extends freely through opening 28b into the side frame housing 21 for a purpose to be described below, while its outer end extends through the hub 20a of wheel 20 and has welded thereon an attaching plate 35 provided with studs 35a extending through such wheel hub 20a and secured thereto by nuts 35b. The wheel 20 and journal 34 are held in place by locking cap 36 threaded over reduced shaft 33.

Returning to FIGS. 1–3, the lower rear frame 22 includes a pair of spaced, parallel and elongated longitudinal members 37 severally welded to and supporting the lower end walls 24 of side frame housings 21 at their lower horizontal front ends 37a and the rear sides of a generally horizontal platform 38 at their upper horizontal rear ends 37b which are connected to such front ends by downwardly and forwardly inclined intermediate portions 37c to locate platform 38 at a convenient elevation for support by a smaller swivel wheel assembly 39 centered rearwardly of side wheels 20, and including a bracket 39a suitably secured to the underside of the platform and a ground-engaging rubber tired wheel 39b. The lower front ends 37a of longitudinal members 37 and the lower vertical portions of rear end walls 26 of side frames 21 are connected by a cross member in the form of an elongated plate 40, the upper end of which also supports the front end of platform 38. These longitudinal members 37, platform 38 and cross member 40 are suitably secured together, such as by welding, and the rear ends 37b of longitudinal members 37 are connected together by a rear cross member 41 (FIG. 11) preferably formed integrally with each longitudinal member 37 to form a generally U-shaped sub-frame of tubular cross section.

Mounted on the rear end of platform 38 is a drive engine which is schematically indicated at 42. This engine preferably is of an internal combustion type provided with suitable fuel such as gasoline from a tank (not shown) which may be mounted beneath upper rear frame 23, and includes a drive shaft 43 projecting transversely from each end thereof. As best seen in FIG. 3, the upper or left end of engine drive shaft 43 is suitably connected by a sprocket-chain drive 44 with the left end of a transverse input shaft 45 journalled in a transmission mechanism 46 suitably mounted on the front end of platform 38, and provided with a transverse output shaft 47 which is suitably connected at each end by a sprocket-chain drive 48 with the driven sprocket 48a fast on the journal 34 for driving the corresponding side wheel 20. The rear end wall 26 of each side frame 21 is provided with an opening 26b for passage of the chain of drive 48, and which drive, as well as the inner end of each journalling device 30, is protected within the corresponding side frame housing.

Referring now to FIGS. 1 and 2, the upper rear frame 23 includes an upper front cross member 49 which is spaced well above platform 38, extends transversely to the rear of dump mechanism D and is connected to each side frame 21 by a pair of spaced, upper front longitudinal members 50 which project forwardly and downwardly from such upper front cross member 49 and are fixed at their front ends to the upper rear end walls 26 of side frame housings 21, as by welding. Such front ends also are welded to the downwardly turned rear edges of horizontal legs 29a of upper end walls 29. Preferably, members 49 and 50 are formed integrally with each other to provide a generally U-shaped sub-frame of tubular cross-section (FIGS. 11 and 12).

Upper rear frame 23 also includes a handle sub-assembly or sub-frame composed of a pair of spaced, rear longitudinal, and preferably tubular, handle members 51 projecting rearwardly and slightly upwardly from front cross member 49 with their front ends suitably fixed thereto as by welding. Such handle members 51 also are suitably connected adjacent their rear ends by a preferably tubular cross member 52 suitably welded thereto. As will be evident from FIG. 1, the longitudinal handle members 51 extend rearwardly beyond the rear end of lower rear frame 22 and preferably are provided with handle grips 53 all for convenience in manually steering cart C by an operator walking behind the cart.

Figure 9:
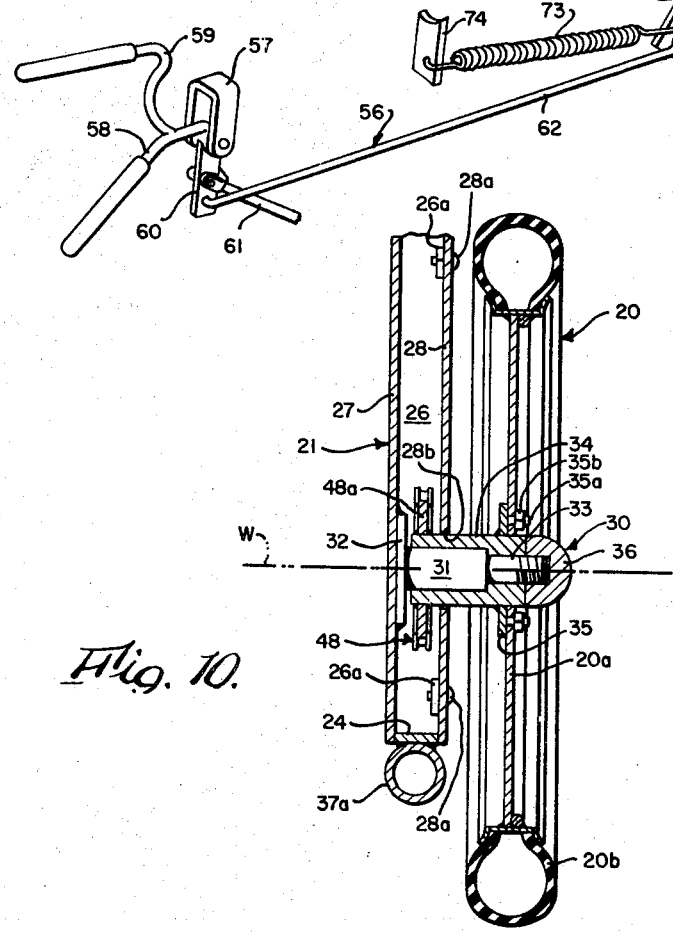
FIG. 9 is an enlarged fragmentary perspective view of the combined engine throttle and transmission brake control mechanisms, together with the spring mechanism normally biasing these control mechanisms to the idle and engaged positions respectively, as shown in FIG. 1.

Preferably, longitudinal handle members 51 support the side edges of a control plate or panel 54 suitably secured thereon. Mounted on the front central portion of panel 54 is a manual gear shift control lever 55 which extends downwardly through the panel and is operatively connected to transmission 46 for disengaging the transmission from the side wheel sprocket-chain drives 48 in a neutral position and for engaging such elements for propelling cart C in either a forward or reverse direction. In addition, combined engine throttle nad transmission brake control mechanisms 56 are associated with the left handle member 51, and as best seen in FIGS. 1 and 9 include a yoke member 57 depending downwardly from such handle member, in which yoke member is pivotally mounted the hub portion of a lower control lever 58 arranged beneath left handle grip 53, with a curved upper control lever 59 projecting therefrom and arranged above such handle grip. The hub of lower control lever 58 is provided with a depending lug 60 on which is mounted the yoke of an elongated rod 61 (only the upper part of which is shown) for controlling the throttle (not shown) of drive engine 42. In the lower end of lug 60 is pivotally mounted the curved rear end of an elongated brake control rod 62, the curved front end of which is pivoted in a crank plate 63 fixed on one end of a transverse rod 64 rotatably extending through the lower ends of lugs 65 depending downwardly from cross member 49. A similar crank plate 66 is fixed on the other end of rod 64 for rotation therewith, and in the lower end of such plate is pivotally mounted the curved front end of a short brake control rod 67, the curved rear end of which is pivoted in the rear arm of a yoke member 68, the front legs of which are rotatable on a short transverse shaft 69 fixed on transmission 46. The upper end of a depending brake rod 70 is pivoted in the legs of yoke member 68 and its lower end carries a brake shoe 71 movable into and out of engagement with a brake wheel or disc 72 fixed on the right end of transmission input shaft 45.

These combined control mechanisms are resiliently biased by a tension spring 73, the curved front end of which is hooked in crank plate 63 and the curved rear end of which is hooked in a lug 74 depending downwardly from left handle member 51. Hence, the aforesaid brake control mechanism is biased to the rear to lower brake shoe 71 into engagement with brake disc 72, while lug 60 is pivoted rearwardly to move throttle control rod 61 to the idle position.

The two manual control levers 58 and 59 function as a safety mechanism in that in the position shown, spring 73 automatically biases brake shoe 71 into engagement with brake disc 72 and throttle control rod 61 to the idle position. If the operator wishes to propel the cart, it is necessary for him to depress upper lever 59 to move the various linkages against the bias of spring 73, and thereby disengage the clutch mechanism and open the throttle mechanism. As soon as the operator releases upper lever 59, both mechanisms automatically are biased by spring 73 to engage the brake mechanism and move the throttle to the idle position for maintaining the cart at rest, even if the operator forgets to move the gear shift control lever 55 to the neutral position. If, for some reason, the spring 73 fails, lower control lever 58 may be grasped by the operator to perform such biasing function.

It is evident from the foregoing description that the basic cart structure is readily adapted for use either as a dump truck or as a lift truck; the hand guided, walk-behind, and self-propelled features being common to both uses. More particularly, the large space S defined by the side frames 21, lower rear frame 22 and upper rear frame 23 is adapted to receive either the dump mechanism D (FIG. 1) or the lift mechanism L (FIG. 11), while the drive engine 42, drive 44, transmission 46 and drives 48 cooperate to propel the cart C in the desired directions. Further, the gear shift control lever 55 is operatively associated with the transmission 46 and the combined throttle and brake control mechanisms 56 are operatively associated with the drive engine 42 and transmission 46 for controlling the starting, stopping, rate and direction of cart propulsion.

Dump truck

As illustrated in FIGS. 1, 2 and 5–8, cart C is readily convertible for use as a dump truck, wherein the dump mechanism D includes a large dump bucket 75 arranged in space S, rack and pinion mechanisms 76 mounting bucket 75 on the upper ends of side frames 21, and a latching mechanism 77 releasably holding bucket 75 in the generally horizontal, loading position shown in full lines in FIG. 1.

As a dump truck, cart C essentially is designed for transporting fluid concrete and the like on scaffolding planks, scaffolding elevators, through tortuous corridors or ways, and over rough terrain from a source, such as the supply chute of a highway concrete conveyor truck, to the form to be filled with concrete. To this end, bucket 75 is designed to have the maximum capacity consistent with providing a dump truck which can be easily steered through narrow ways provided by scaffolding and door openings of the structure being constructed. Hence, bucket 75 comprises generally vertical, flat side walls 78 each arranged close to the inner side wall 27 of the corresponding side frame or housing 21 and rising to a level above this side frame or housing. To the upper edge of each bucket side wall 78 is welded the lower edge of an upwardly and outwardly slanting diagonal side wall 79 which extends over the corresponding side frame or housing 21 and beyond the plane of the inside circular face of the tire 20b of the corresponding side wheel 20, as best shown in phantom in FIG. 2. To the upper edge of each bucket side wall 79 is welded an upright wall 80, the forward end of which is at a lower elevation than its rear end 81.

The other edges of the vertical and diagonal side walls 78, 79 are welded to and connected by a cross plate or bottom wall indicated generally at 82, the generally upright but slightly rearwardly inclined rear end 83 of which terminates at the top of the outwardly flaring or diagonal side walls 79, the central part 84 of which is of rounding or drum-shaped form and the front flat end 85 of which slopes forwardly and upwardly to terminate at the upper ends of diagonal side walls 79 so as to provide a pouring lip or edge 85a over which the contents of bucket 75 are dumped and held against spilling laterally by the forward ends of the vertical top side plates or walls 80. Bucket 75 is completed by a generally vertical rear wall or plate 86 the lower end of which is welded to the upper edge of the rear end 83 of bottom wall 82 and the ends of which are welded to the rear ends 81 of upright walls 80 to provide a rear top extension for protecting against spilling of the bucket contents laterally and rearwardly onto side frames 21 and upper and lower rear frames 23, 22 and the various elements mounted thereon.

Figure 6:
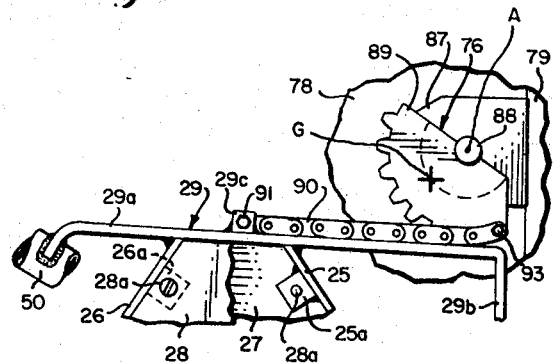
FIG. 6 is a view similar to FIG. 5, but illustrating such rack and pinion mechanism in the forward unloading position.
Figure 7:
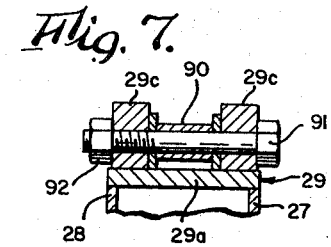
FIG. 7 is a fragmentary section taken on line 7—7 of FIG. 5 to illustrate the removable attachment of the rear end of the chain rack to the lugs on the upper end wall of the side frame.
Figure 8:
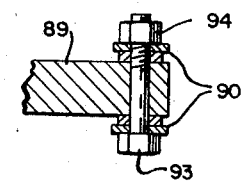
FIG. 8 is a fragmentary section taken on line 8—8 of FIG. 5 to illustrate the removable attachment of the front end of the chain rack to the gear segment pinion.

When latching mechanism 77 is released, the bucket 75 is both self-emptying and self-righting, and to this end is mounted on the upper end walls 29 of side frames 21 by rack and pinion mechanisms 76 to swing or rotate about and reciprocate with a generally horizontal, transverse swing axis A which is reciprocable fore and aft above and along such upper side frame end walls 29 above the transverse side wheel axis W between a rear and generally horizontal, loading position shown in solid lines in FIG. 1, and a forward and generally vertical unloading position shown in broken lines in FIG. 1. As also seen in FIGS. 5 and 6, each rack and pinion mechanism 76 includes a base plate 87 extending downwardly from the juncture of the vertical and diagonal bucket side walls 78, 79 and welded to the former. A stub shaft 88 projects outwardly from each base plate 87 and welded to each of these elements is a pinion in the form of a gear segment 89 rollable fore and aft along a rack in the form of a flexible chain 90 which is arranged on the corresponding horizontal upper end wall leg 29a and trained over pinion 89, with its rear end or links attached to and between lugs 29c by means of a bolt 91 passing therethrough and nut 92, as best seen in FIG. 7, and its front end attached to the truncated upper forward end of pinion 89 by means of a similar bolt 93 passing through the front chain link and gear segment and a nut 94 threaded on bolt 93, as best seen in FIG. 8.

Referring specifically to FIGS. 1 and 5, wherein bucket 75 is shown in solid lines in the rear and generally horizontal, loading position, it is to be noted that latching mechanism 77 is engaged, swing axis A is arranged above and just slightly to the rear of side wheel axis W, the central part 84 of the bucket bottom wall 82 is located below side wheel axis W to provide the bucket with a low center of gravity G which is shown as coincident with the mass center of pinion gear segment 89 when bucket 75 is empty. This mass center is arranged below and forwardly of swing axis A to locate the bucket center of gravity G below and forwardly of such swing axis when the empty bucket 75 is in the loading position shown in solid lines in FIG. 1. Hence, upon release of latching mechanism 77, bucket 75 automatically moves forwardly to the generally vertical unloading position shown in broken lines in FIG. 1, this movement being a combined rotation and translation of the bucket and its swing axis A, as pinion gear segment 89 rolls forwardly along chain 90 on upper end wall leg 29a.

As also seen in FIG. 6 upon reaching such unloading position, bucket 75 automatically will dump its load, such as fluid concrete (not shown), the forward movement of the bucket being arrested by contact between the diagonal side walls 79 of the bucket and the rubber tires of side wheels 20. If desired, the slant of such diagonal side walls 79 of the bucket could be so adjusted to permit bucket 75 to tip further than the generally vertical position shown in broken lines in FIG. 1. Upon emptying of its load, the mass center of pinion gear segment 89 causes the center of gravity G of the now empty bucket to be located below and rearwardly of swing axis A, which is positioned forwardly of wheel axis W in the unloading position. Hence, bucket 75 automatically moves rearwardly to the upright loading position shown in solid lines in FIG. 1, and will be held in such position by engagement of latching mechanism 77. As a consequence, when cart C has reached the dumping site, it is only necessary for the operator to releae latching mechanism 77, whereupon bucket 75 automatically will dump its load and return to the upright loading position without any further effort upon the part of the operator.

As noted above, bucket 75 has been considered to be empty for convenience in describing the action of the mass center of the gear segment 89 in positioning the bucket center of gravity G. When loaded, the bucket 75 is so designed that the super-imposition of the center of gravity of the load will not adversely effect such action. Hence, the loaded center of gravity will be approximately in the position shown at G in solid lines in FIG. 1, although the addition of the load may move such center of gravity slightly forwardly and slightly downwardly from such position. Of course, when the bucket 75 is in the broken line unloading position, as the load is being dumped, the loaded center of gravity initially will be maintained in front of and below swing axis A, and then gradually will revert to the rearward position shown in FIG. 6 when the bucket has been emptied, for automatic righting thereof.

Referring now to FIGS. 1, 2 and 4 in particular, the latching mechanism 77 for releasably maintaining bucket 75 in the solid line loading position of FIG. 1 includes a base plate 95 which is suitably welded in place on the adjacent central top portions of cross member 49 and control panel 54 of upper rear frame 23. This base plate 95 is provided with an upwardly and forwardly open recess 95a for receiving the forwardly notched keeper 96 which is pivotally mounted in such recess by transverse shaft 96a and is normally biased to the upper and forward engaged position shown by a compression spring 97 suitably secured to plate 95 and keeper 96. A handle 98 is welded to the upper end of keeper 96 for manually releasing the same, and the latching mechanism is completed by a generally U-shaped latch 99 projecting generally horizontally and rearwardly from the upper rear end portion 83 of bucket bottom wall 82 with the web of latch 99 being received in the notched keeper 96 in the engaged position illustrated.

When the operator desires to unload bucket 75, he merely depresses lever 98 to disengage keeper 96 from latch 99, whereupon bucket 75 automatically rolls forwardly to the unloading position shown in broken lines in FIG. 1. Likewise, upon unloading, bucket 75 automatically rolls back to the solid line loading position, the momentum of the bucket causing latch 99 to be cammed into the notch in keeper 96 by momentarily compressing spring 97.

Lift truck

In addition to the numerous advantages possessed by inventive cart C as a dump truck, it has the additional important advantage of readily being convertible to use as a lift truck, simply by removing bucket 75 and its rack and pinion mechanisms 76 from lugs 29c and by replacing these components of the dump mechanism D with components of the lift mechanism generally indicated at L in FIGS. 11-15. Such lift mechanism L basically includes an elongated and generally upright, guide frame 100 arranged in the rear of the large space S between side wheels 20 and removably mounted on the upper end walls 29 of side frames 21 by means of lugs 29c, a load supporting frame generally indicated at 101 and reciprocable up and down along guide frame 100, and a preferably hydraulic, fluid operated system 102 including means mounted on platform 38 of lower rear frame 22 and operatively associated with load supporting frame 101 for reciprocating the same.

As best seen in FIGS. 11-13, welded guide frame 100 is arranged in front of and adjacent upper cross member 49 and lower cross member 40, and includes a pair of elongated and generally upright, rear guide members in the form of hollow tubular channels 103 having slots 104 along their inner sides and coextensive with their length. The generally vertical, lower end portions 103a of channels 103 are arranged between the inner side walls 27 of side frames 21 and project below cross member 40 a short distance above the ground, while the rearwardly inclined upper end portions 103b project above upper cross member 49 and are connected by an upper cross guide member 105 of similar tubular channel construction. An upper pair of side guide plates or members 106 project forwardly and downwardly from the upper ends 103b of rear guide member 103, having their generally horizontal rear end portions 106a curved inwardly and projecting laterally outwardly from the ends of upper cross guide member 105, while their lower and generally vertical, front end portions 106b project downwardly between lugs 29c on each upper side frame end wall leg 29a and are removably attached thereto by nuts and bolts 91 and 92 of FIG. 7. A lower pair of generally horizontal side guide plates or members 107 are welded at their front ends to the lower front end portions 106b of upper side guide members 106 and at their inwardly curved rear ends to channels 103. The space between the upper and lower side guide members 106, 107 is filled by mesh or screening 108, as is the space between the upper end portions 103b of channels 103 by mesh or screening 109, the latter being provided with an elongated downwardly open central slot 110 reinforced by a border strip 111 to provide the necessary clearance for reciprocation of a ledge portion of the load supporting frame 101 to be described below.

If desired, guide frame 100 may be extended upwardly as best shown in FIGS. 11 and 13, particularly when the lift mechanism L is supporting a relatively tall load, such as the stack of concrete blocks B on pallet P, shown in broken lines in FIG. 11, as compared to the mobile mortar tub T of FIG. 12. To this end, an extension or sub-frame 112 is provided, and includes a pair of upright side channels 113 connected at their upper and lower ends by upper and lower cross channels 114, with the space between these channels being filled by suitable mesh or screening 115. In order to attach extension frame 112 to the major portion of guide frame 100, the lower cross channel is provided adjacent each end with a downwardly depending peg 116 which is adapted to be slidably received in a socket 117 welded in place between the outer ends of upper cross guide member 105 and the rear ends of upper side guide members 106.

Continuing with FIG. 13, the load supporting frame 101 is composed of a pair of upright longitudinal guided members 118 of tubular channel construction and connected at their upper and lower ends by cross guided channels or members 119, with the enclosed space being filled with wire mesh or screening 120. The upright guided members 118 are provided on their outer sides with vertically spaced pairs of generally horizontal, transverse stub shafts 121 which, as best seen in FIG. 14 are adapted to project laterally through slots 104 in channels 103 and severally carry roller bearing wheel assemblies 122 rollable up and down and within channels 103 about the axes of shafts 121.

A plurality of generally horizontal load supporting fork members 123 and 124 project forwardly from the lower cross guided member 119, member 123 being in the form of an elongated and generally U-shaped tine, and members 124 being in the form of single tines arranged on each side of central tine 123. As will be described in greater detail below, load supporting frame 101 is movable up and down along guide frame 100 between the lower ground engaging position shown in FIGS. 11 and 12 and an upper elevated position (not shown) approximately 10-11 inches above the ground.

The load supporting frame 101 is completed by an inverted, generally channel-shaped, cantilever ledge or trough 125 welded centrally on the upper cross guided channel 119 and projecting rearwardly therefrom. Trough 125 preferably is provided with an upstanding lug 126 adjacent its front end and carrying a wire bale 127 preferably in the form of a ring or loop having a reentrant hook portion 128 at its free rear end for engagement with the U-shaped handle h on the rear of the mortar tub T to secure the tub in place on the load supporting frame 101 when the tines are raised to an elevated position (not shown) engaging the bottom of tub T.

As best seen in FIGS. 1, 3, 11, 12 and 15, the hydraulic fluid operated system 102 for reciprocating load supporting frame 101 includes a rotary pump 129 which is provided with input and output terminals or connections 129a, 129b respectively, and is mounted on platform 38 between drive engine 42 and transmission 46. Pump 129 is conveniently driven by a sprocket-chain drive 130 connected to the other or right end of engine drive shaft 43, and is supplied with fluid by a reservoir or container 131 mounted on the left rear side of platform 38 and provided with inlet and outlet terminals or connections 131a, 131b. In turn, pump 129 drives a generally upright fluid motor 132 which is mounted on the front end of platform 38 and includes a cylinder 133 provided with a combined inlet and outlet terminal or connection 133a at its lower rear end which extends freely downwardly through an enlarged opening 38a in the front end of platform 38 and rests loosely in a partial enclosure depending downwardly from the front end of the platform. This enclosure is formed by side walls 134, bottom wall 135, lower front wall 136, and upper rear wall 137. Cylinder 133 is provided with a reciprocal piston or ram 138, the upper end 139 of which is slidably engageable with the underside of the web of trough or ledge 125 (FIG. 15) for raising or lowering load supporting frame 101. As will be evident, the loose fit of cylinder 133 in its enclosure and the sliding engagement between the upper end 139 of ram 138 and the underside of web of trough 125 readily permit the load supporting frame 101 to tilt as it moves along the rearwardly inclined upper guide channel portions 103b.

The fluid operated system 102 also includes by a manually operable control valve 140 which is suitably mounted on the underside of control panel 54, and provided with inlet, outlet and combined inlet and outlet terminals or connections 140a, 140b and 140c respectively, as well as an operating lever 141 extending upwardly through panel 54. The system is completed by a fluid circuit operatively connecting pump 129, reservoir 131, fluid motor 132 and control valve 140. This fluid circuit includes a supply line 142 connecting the input terminal 129a of pump 129 with the outlet terminal 131b of reservoir 131; a power line 143 connecting the output terminal 129b of the pump with inlet terminal 140a of the valve; a return line 144 connecting the inlet terminal 131a of the reservoir with the outlet terminal 140b of the valve, and a combined power and return line 145 connecting the combined inlet and outlet terminal 140c of the valve with the combined inlet and return terminal 133a of cylinder 133. By manual manipulation of lever 141, the control valve 140 is movable between an operative position wherein it connects the output of pump 129 with the combined inlet and outlet of cylinder 133 through power line 143 and combined power and return line 145, in order to lift load supporting frame 101 along guide frame 100, and an inoperative or by-pass position wherein valve 140 connects not only the output of pump 129 with the inlet of reservoir 131 through power line 143 and return line 144 to recirculate the fluid, but also the combined inlet and outlet of cylinder 133 with the inlet of reservoir 131 through the combined power and return line 145 and return line 144, in order to lower load supporting frame 101 along guide frame 100.

It is to be noted that guide frame 100 will remain substantially in the position shown, both when the load supporting frame 101 is at rest on the ground and during reciprocation thereof, even though the only points of attachment of guide frame 100 to the cart are at lugs 29c. Any tendency of guide frame 100 to pivot about the lugs in a clockwise direction, as viewed in FIGS. 11 and 12 during lifting of frame 101 is prevented by lower cross member 40, and any tendency to pivot counter-clockwise during lowering of frame 101 is prevented by upper cross member 49. Likewise, the slot 110 in screening 109 provides adequate clearance for piston 138 and trough 125 during raising and lowering of frame 101.

Hence, merely by manipulating control valve lever 141 the operator can readily position the lift mechanism L to carry or deposit various types of loads such as the stack of blocks B on pallet P shown in FIG. 11 or the wheeled mortar tub T shown in FIG. 12. Likewise, through the manipulation of the gear shift lever 55 and combined throttle and brake control mechanisms 56, the operator readily can transport such loads from place to place with little or no manual effort. At the same time, should it be desired to reconvert cart C to a dump truck, it is but a simple matter to disengage fluid motor 132 from the load supporting frame 101 and the rear guide frame from lugs 29c for removal and replacement by the bucket 75 and rack and pinion mounting mechanisms 76 of dump mechanism D.

It now will be seen how the invention accomplishes the various objects and numerous advantages thereof likewise will be apparent. While the invention has been described and illustrated herein by reference to certain preferred embodiments thereof, it is to be understood that various changes and modifications may be made therein by those skilled in the art, without departing from the inventive concept, the scope of which is to be determined by the appended claims.

What is claimed is:

1. A hand guided, walk-behind, self-propelled cart for conveying material either as a dump truck or as a lift truck, and comprising a pair of spaced, parallel ground engaging side wheels, a pair of spaced, parallel and generally vertically extending side frames disposed inwardly of and close to each respective side wheel, means severally journalling said side wheels on said side frames for rotation about a common generally horizontal transverse axis, upper and lower superposed rear frames connecting respectively the upper and lower portions of said side frames and defining therewith a large space open at the top, front and bottom for selectively receiving either a dump mechanism or a lift mechanism, at least one of said side frames and said rear frames including means for selectively attaching either said dump mechanism or said lift mechanism, said lower rear frame including a generally horizontal platform supported by a smaller ground engaging swivel wheel arranged rearwardly of said side wheels, a drive engine mounted on said platform and drive means operatively connecting said drive engine with at least one of said wheels, and said upper rear frame including handle means arranged above and extending rearwardly beyond said lower rear frame for manually steering said cart.

2. The cart of claim 1 wherein said attaching means includes lug means, said side frames are in the form of hollow housings severally receiving said journalling means, with at least one of said housings being provided at its upper end with said lug means for attachment to said dump mechanism or lift mechanism.

3. The cart of claim 1 wherein said lower rear frame includes a pair of elongated longitudinal members supporting the lower ends of said side frames at their front ends and the sides of said platform at their rear ends, a front cross member supporting the front end of said platform, and a rear cross member supporting the rear end of said platform, and said drive means includes an output shaft journalled on said platform and means operatively connecting said output shaft with at least one of said side wheels.

4. The cart of claim 1 wherein said upper rear frame includes a front cross member, a pair of front longitudinal members projecting forwardly from said cross member and fixed at their front ends to the upper rear ends of said side frames, and said handle means includes a pair of rear longitudinal members projecting rearwardly from said front cross member, and a rear cross member connecting said rear longitudinal members adjacent their rear ends.

5. The cart of claim 1 wherein said attaching means includes lug means, said side frames are in the form of hollow housings severally receiving said journalling means and provided at their upper ends with said lug means for attachment to said dump mechanism or lift mechanism, said lower rear frame includes a pair of elongated longitudinal members supporting the lower ends of said housings at their front ends and the sides of said platform at their rear ends, a front cross member connecting the lower rear ends of said housings and supporting the front end of said platform, and a rear cross member supporting the rear end of said platform, and said drive means includes a transverse output shaft journalled on said platform and means extending through the rear ends of said housings and severally operatively connecting said output shaft with said journalling means in said housings.

6. The cart of claim 1 wherein said attaching means includes lug means, said side frames are in the form of hollow housings severally receiving said journalling means and provided at their upper ends with said lug means for attachment to said dump mechanism or lift mechanism, said upper rear frame includes a front cross member, a pair of front longitudinal members projecting forwardly and downwardly from said front cross member and fixed at their front ends to the upper rear ends of said housings, and said handle means includes a pair of rear longitudinal members projecting rearwardly from said front cross member, a rear cross member connecting said rear longitudinal members adjacent their rear ends, and means operatively associated with said drive engine and drive means for controlling the starting, stopping, rate and direction of propulsion of said cart.

7. The cart of claim 1 wherein said lower rear frame includes a pair of elongated longitudinal members supporting the lower ends of said side frames at their front ends and the sides of said platform at their rear ends, a front cross member connecting the lower rear ends of said side frames and supporting the front end of said platform, and a rear cross member supporting the rear end of said platform, said upper rear frame includes an upper front cross member, a pair of front longitudinal members projecting forwardly and downwardly from said front cross member and fixed at their front ends to the upper rear ends of said side frames, and said handle means includes a pair of rear longitudinal members projecting rearwardly from said front upper cross member, a rear upper cross member connecting said rear longitudinal members adjacent their rear ends, and means operatively associated with said drive engine and drive means for controlling the starting, stopping, rate and direction of propulsion of said cart.

8. The cart of claim 1 wherein said attaching means includes lug means, said side frames are in the form of hollow housings severally receiving said journalling means and provided at their upper ends with said lug means for attachment to said dump mechanism or lift mechanism, said lower rear frame includes a pair of elongated longitudinal members severally supporting the lower ends of said housings at their front ends and the sides of said platform at their rear ends, a front cross member connecting the lower rear ends of said housings and supporting the front end of said platform, and a rear cross member supporting the rear end of said platform, said drive engine is mounted on the rear end of said platform and includes a transverse output shaft, said drive means includes a transmission mechanism provided with transverse input and output shafts journalled on the front end of said platform, means operatively connecting said engine output shaft with said input shaft, and means extending through the rear ends of said housings and severally operatively connecting said output shaft with said journalling means in said housings, said upper rear frame includes an upper front cross member, a pair of upper front longitudinal members projecting forwardly and downwardly from said upper front cross member and fixed at their front ends to the upper rear ends of said housings, and said handle means includes a pair of rear longitudinal members projecting rearwardly from said upper front cross member, an upper rear cross member connecting said upper rear longitudinal members adjacent their rear ends, and manually operable control means mounted on said handle means and operatively associated with said drive engine and drive means for controlling the starting, stopping, rate and direction of propulsion of said cart, said control means including combined throttle and brake control mechanisms severally operatively associated with said drive engine and said input shaft and including resilient means normally biasing said throttle control mechanism to the idle position and said brake control mechanism to the engaged position for maintaining said cart at rest, and a manually operable gear shift control mechanism operatively connected to said transmission mechanism for selectively engaging and disengaging said input and output shafts of said transmission mechanism.

9. The cart of claim 1 as a dump truck, wherein said dump mechanism comprises a dump bucket arranged within said large space, means attached to said attaching means and mounting said dump bucket on the upper ends of said side frames to rotate about and reciprocate with a generally horizontal, transverse swing axis reciprocable fore and aft above said side wheel axis between a rear and generally horizontal, loading position and a forward and generally, vertical, unloading position, and latching means releasably holding said bucket in said loading position wherein the central part of the bottom of said bucket is below said side wheel axis to provide said bucket with a low center of gravity, said mounting means locating said center of gravity forwardly of said swing axis when said bucket is in said loading position, whether filled or empty, but rearwardly of said swing axis when said bucket is in said unloading position and empty, whereby said bucket moves automatically not only forwardly from said loading position to said unloading position upon release of said latching means to dump its load, but also rearwardly from said unloading position to said loading position upon dumping its load.

10. The dump truck of claim 9 wherein said mounting means includes a rack and a pinion rollable fore and aft along said rack, said pinion being fixed on one side of said bucket for rotation about and reciprocation with said swing axis, and said rack being arranged on the upper end of one of said side frames beneath said pinion.

11. The dump truck of claim 9 wherein said latching means includes a latch and a releasable keeper engageable with said latch, said latch being arranged on one of said bucket and upper rear frame, and said keeper being arranged on the other of said bucket and upper rear frame and positioned to be manually released by a workman guiding said truck from the rear.

12. The dump truck of claim 11 wherein said mounting means includes a rack and a pinion rollable fore and aft along said rack upon release of said keeper, said pinion being fixed on one side of said bucket for rotation about and reciprocation with said swing axis, and said rack being arranged on the upper end of one of said side frames beneath said pinion.

13. The dump truck of claim 9 wherein said attaching means includes lug means, at least one of said side frames is provided at its upper end with said lug means for attachment to said dump mechanism, and said mounting means includes a rack and a pinion rollable fore and aft along said rack, said pinion being in the form of a gear segment fixed on one side of said bucket to rotate about and reciprocate with said swing axis, and said rack being in the form of a flexible chain arranged on the upper end of said one side frame beneath and trained over said pinion, with its rear end attached to said lug means and its front end attached to said gear segment.

14. The dump truck of claim 9 wherein said upper rear frame includes a cross member extending transversely behind said bucket and a pair of longitudinal members projecting forwardly from said cross member and fixed at their front ends to the upper rear ends of said side frames, and said latching means includes a latch member and a releasable keeper mechanism engageable with said latch member, said latch member being arranged on the upper rear end of said bucket and said keeper mechanism being arranged on said cross member and positioned to be manually released by a workman guiding said truck from the rear.

15. The dump truck of claim 14 wherein said attaching means includes lug means, each of said side frames is provided at its upper end with said lug means for attachment to said dump mechanism, and said mounting means includes a pair of racks and a pair of coaxial pinions each rollable fore and aft along its rack upon release of said latching mechanism, each pinion being in the form of a gear segment fixed on the adjacent side of said bucket to rotate about and reciprocate with said swing axis, and each rack being in the form of a flexible chain arranged on the upper end of each side frame beneath and trained over its pinion, with its rear end attached to said lug means and its front end attached to said gear segment.

16. The dump truck of claim 15 wherein, when said bucket is in said loading position, the mass center of said gear segment is arranged below and forwardly of said swing axis to locate said center of gravity below as well as forwardly of said swing axis, even when said bucket is empty, but when said bucket is in said unloading position, said mass center of said gear segment is arranged below and rearwardly of said swing axis to locate said center of gravity below as well as rearwardly of said swing axis, when said bucket is empty.

17. The cart of claim 1 as a lift truck, wherein said lift mechanism includes an elongated and generally upright, guide frame arranged in the rear of said large space, attached to said attaching means and mounted on said side frames, a load supporting frame arranged in said large space and reciprocable up and down along said guide frame, and fluid operated means operatively associated with said load supporting frame for reciprocating the same.

18. The lift truck of claim 17, wherein said guide frame includes a pair of elongated and generally upright, rear guide members having their lower ends arranged between said side frames and their upper ends projecting above said upper rear frame and connected by an upper cross guide member, and a pair of side guide members projecting forwardly from said upper ends of said rear guide members and attached at their front ends to the upper ends of said side frames.

19. The lift truck of claim 17, wherein said load supporting frame includes a generally upright guided member provided with a wheel rollable up and down along said guide frame about a generally horizontal axis, and a generally horizontal load supporting member projecting forwardly of said guided member.

20. The lift truck of claim 17, wherein said fluid operated means includes a generally upright fluid motor mounted on the front end of said platform and having a piston engageable with said load supporting frame for reciprocating the same.

21. The lift truck of claim 17, wherein said attaching means includes lug means, each of said side frames is provided at its upper end with said lug means for attachment to said guide frame, said lower rear frame includes a generally horizontal lower cross member supporting the front end of said platform, said upper rear frame includes a generally horizontal upper cross member connected to the upper rear ends of said side frames, and said guide frame is arranged in front of and adjacent said upper and lower cross members and includes a pair of elongated and generally upright, rear guide members having their lower ends arranged between said side frames and projecting below said lower cross member and their upper ends projecting above said upper cross member and connected by an upper cross guide member, an upper pair of side guide members projecting forwardly and downwardly from said upper ends of said rear guide members and attached at their lower front ends to said lug means, and a lower pair of side guide members connecting said rear guide members and upper side guide members.

22. The lift truck of claim 17, wherein said load supporting frame includes a pair of generally upright guided members connected at their upper and lower ends by generally horizontal, upper and lower cross guided members respectively and provided on their outer sides with wheels rollable up and down along said guide frame about generally horizontal transverse axes, and a plurality of generally horizontal, load supporting members projecting forwardly from said lower cross guided member.

23. The lift truck of claim 17, wherein said fluid-operated means includes a pump driven by said drive engine and having an input and output, a fluid reservoir having an inlet and outlet, a generally upright fluid motor mounted on the front end of said platform, driven by said pump and having a cylinder provided with a combined inlet and outlet and a piston engageable with said load supporting frame for reciprocating the same, a manually operable control valve mounted on said handle means and having an inlet, outlet and a combined inlet and outlet, and a fluid circuit operatively connecting said pump, reservoir, fluid motor and control valve, said fluid circuit including a supply line connecting the input of said pump with the outlet of said reservoir, a power line connecting the output of said pump with the inlet of said valve, a return line connecting the inlet of said reservoir with the outlet of said valve, and a combined power and return line connecting the combined inlet and outlet of said valve with the combined inlet and outlet of said fluid motor, said control valve being movable between an operative position wherein it connects the output of said pump with the combined inlet and outlet of said cylinder through said power and combined power and return lines to lift said load supporting frame along said guide frame, and an inoperative position wherein it connects not only the output of said pump with the inlet of said reservoir through said power and return lines to recirculate the fluid but also the combined inlet and outlet of said cylinder with the inlet of said reservoir through said combined power and return line and said return line to lower said load supporting frame along said guide frame.

24. The lift truck of claim 23 wherein said attaching means includes lug means, each of said side frames are provided at their upper ends with said lug means for attachment to said guide frame, said lower rear frame includes a lower cross member connecting the lower rear ends of said side frames and supporting the front end of said platform in front of said fluid motor, said upper rear frame includes an upper cross member spaced above and behind said fluid motor and connected to the upper rear ends of said side frames, said guide frame is arranged in front of and adjacent said upper and lower cross members and said fluid motor and includes a pair of elongated and generally upright, rear guide members in the form of hollow tubular channels having slots along their inner sides, with their generally vertical lower ends arranged between said side frames and projecting below said lower cross member and their rearwardly inclined upper ends projecting above said upper cross member and connected by an upper cross guide member, an upper pair of side guide members projecting forwardly and downwardly from said upper ends of said rear guide members and attached at their lower front ends to said lug means, and a lower pair of side guide members connecting said rear and upper guide members, and said load supporting frame includes a pair of generally upright guided members connected at their upper and lower ends by upper and lower, generally horizontal cross guided members respectively and severally provided on their outer sides with vertically spaced and generally horizontal, transverse shafts projecting through said slots and severally carrying wheels rollable up and down along and within said channels about the axes of said shafts, and a plurality of generally horizontal load supporting members projecting forwardly from said lower cross guided member and movable up and down between a lower ground engaging position and an elevated position.

References Cited

UNITED STATES PATENTS

| | | | |
|---|---|---|---|
| 1,688,650 | 10/1928 | Parker | 214—621 |
| 1,834,965 | 12/1931 | Osman | 298—17.5 |
| 1,978,170 | 10/1934 | Roesner | 214—621 |
| 2,121,224 | 6/1938 | Garlinghouse | 298—2 |
| 2,222,086 | 11/1940 | Moore | 298—1 |
| 2,297,344 | 9/1942 | Beall | 298—2 |
| 2,533,549 | 12/1950 | Bell | 298—2 |

(Other references on following page)

17
UNITED STATES PATENTS

| | | |
|---|---|---|
| 2,649,162 | 8/1953 | Wooldridge. |
| 2,907,125 | 10/1959 | Gardner _____ 298—17 |
| 3,266,599 | 8/1966 | Dearden _____ 187—9 |

FOREIGN PATENTS

| | | |
|---|---|---|
| 13,942 | 1889 | Great Britain. |
| 544,065 | 3/1942 | Great Britain. |
| 748,279 | 4/1956 | Great Britain. |
| 1,199,608 | 6/1959 | France. |

18
OTHER REFERENCES

Nova: German printed app. No. 1,030,688, Jan. 2, 1954.

RICHARD J. JOHNSON, Primary Examiner

U.S. Cl. X.R.

187—9

PO-1050
(5/69)

UNITED STATES PATENT OFFICE
CERTIFICATE OF CORRECTION

Patent No. 3,525,099      Dated August 18, 1970

Inventor(s) John Fuhrmann

It is certified that error appears in the above-identified patent and that said Letters Patent are hereby corrected as shown below:

Column 1, line 15, "guider" should be "guided".

Column 3, line 45, insert "drive" before components.

Column 3, line 49, insert "to" before illustrate.

Column 6, line 12, "nad" should be "and".

Column 8, line 50, "releae" should be "release".

SIGNED AND SEALED
NOV 3 1970

(SEAL)
Attest:

Edward M. Fletcher, Jr.
Attesting Officer

WILLIAM E. SCHUYLER, JR.
Commissioner of Patents